(12) United States Patent
Yeh

(10) Patent No.: US 8,065,706 B2
(45) Date of Patent: Nov. 22, 2011

(54) WIRELESS CAR DIGITAL AUDIO/VIDEO SYSTEM AND ITS METHOD

(75) Inventor: Tsuei-Chi Yeh, Jhonghe (TW)

(73) Assignee: Funtoro Inc., Taipei Hsien (TW)

( * ) Notice: Subject to any disclaimer, the term of this patent is extended or adjusted under 35 U.S.C. 154(b) by 1316 days.

(21) Appl. No.: 11/344,168

(22) Filed: Feb. 1, 2006

(65) Prior Publication Data

US 2007/0086750 A1 Apr. 19, 2007

(30) Foreign Application Priority Data

Oct. 14, 2005 (TW) .............................. 94135844 A

(51) Int. Cl.
*H04N 7/18* (2006.01)

(52) U.S. Cl. ................ 725/75; 725/81; 725/82; 463/42; 463/43; 370/401; 455/3.01; 455/39; 455/41.2; 455/345; 386/200; 386/230; 386/231

(58) Field of Classification Search .................... 386/46, 386/83, 95, 200, 230, 231, 234, 362; 370/401, 370/402; 709/201, 203, 217–219, 227, 246; 463/1, 42, 43; 455/3.01, 39, 41.2, 344, 345, 455/343.5, 343, 6; 725/74, 75, 78, 81, 82
See application file for complete search history.

(56) References Cited

U.S. PATENT DOCUMENTS 6,037,995 A * 3/2000 Ichifuji et al. .................. 725/40
2002/0044217 A1 * 4/2002 Burchard et al. ............. 348/459
2002/0183036 A1 * 12/2002 Marko et al. .................. 455/343
2004/0213273 A1 * 10/2004 Ma .................................. 370/401
2004/0230699 A1 * 11/2004 Gargi ............................. 709/246
2005/0005298 A1 * 1/2005 Tranchina ....................... 725/81
2005/0071375 A1 * 3/2005 Houghton et al. ......... 707/104.1
2005/0076088 A1 * 4/2005 Kee et al. ....................... 709/206
2005/0164793 A1 * 7/2005 Merimovich et al. ........... 463/42
2005/0249357 A1 * 11/2005 Schedivy ......................... 381/86
2006/0048196 A1 * 3/2006 Yau ................................. 725/81
2006/0072627 A1 * 4/2006 Kugumiya et al. ........... 370/503
2007/0015485 A1 * 1/2007 DeBiasio et al. ............. 455/345

* cited by examiner

*Primary Examiner* — Thai Tran
*Assistant Examiner* — Mishawn Dunn
(74) *Attorney, Agent, or Firm* — Guice Patents PLLC

(57) ABSTRACT

The present invention relates to a wireless car digital AV system to be applied in a car, and the wireless car digital AV system comprises an AV Host and at least one or multiple display devices. The AV Host includes a storage device and a wireless network interface, and the storage has at least one digital AV file. The display device includes a wireless network interface and a display panel. The display device is connected to the AV Host by the wireless network interface, such that the display device can receive and play the digital AV file transmitted from the AV Host through the wireless network interface. Furthermore, the present invention also discloses a method for an automobile AV Host to wirelessly transmit a video file to a display device.

17 Claims, 4 Drawing Sheets

WIRELESS CAR DIGITAL AUDIO/VIDEO SYSTEM AND ITS METHOD

FIELD OF INVENTION

The present invention relates to a wireless car digital audio/video (AV) system, and more particularly to a wireless AV Host that uses a wireless network interface to send multiple encrypted digital AV files to one or multiple display devices, and the display devices can play back the digital AV files after decrypting and decoding.

BACKGROUND OF THE INVENTION

Referring to FIG. 4 for the schematic view of a conventional automobile AV system, the conventional automobile AV system such as a DVD or DTV (digital television) usually includes a main system 50 and one or more display panel 60, and the display panels 60 are usually connected to the main system 50 by a cable 65 to receive analog AV signals such as NTSC or PAL transmitted from the main system 50.

However, the aforementioned conventional automobile AV system has the following shortcomings: 1. the program shown on each display panel 60 is the same among all panels 60, since the main system 50 can only play back one AV stream at one time. 2. Cable 65 between main system 50 and display panels 60 requires more wiring efforts. 3. The cable connection restricts the portability of display panels 60.

SUMMARY OF TE INVENTION

To overcome the foregoing shortcomings of the prior art, it is an objective of the present invention to provide a wireless automobile AV Host that uses a wireless network interface to send multiple encrypted digital AV files to multiple display devices, and the display devices will play the AV files after the files are decrypted and decoded. The AV host can send different AV files to different display devices, so that each display devices can show different programs in parallel.

Another objective of the present invention is to provide a wireless car digital AV system in which the AV Host and the display device are connected wirelessly. Since there is no wiring required between the AV Host and the display devices, it provides a possibility for general consumers to do the installations.

A further objective of the present invention is to provide a wireless car digital AV system in which the AV Host and the display device are connected wirelessly; therefore, the display device is portable, or can be easily moved inside or outside the car.

Another objective of the present invention is to provide a display device capable of downloading a firmware code from the AV Host. The firmware of the display device, or the downloaded code, can configure the display device into different functions, such as a DVD decoder, a DTV decoder, a MP3 decoder, a game player, or a GPS navigator, and so on. Alternatively, the code downloading can be used to upgrade the functions or version of the firmware of the display device.

To achieve the foregoing objectives, an wireless car digital AV system in accordance with the present invention comprises an AV Host having a storage device and a wireless network interface, wherein the storage device has at least one digital AV file; and at least one display device having a wireless network interface and a display panel which can be connected to the AV Host by the wireless network interface, such that the display device can receive and play the digital AV file transmitted from the AV Host through the wireless network interface.

To achieve the foregoing objectives, a method for an automobile AV Host capable of sending a digital AV file to a display device comprises the following steps: providing an AV Host to be installed in a car, wherein the AV Host includes a storage device and a wireless network interface, and the storage device has at least one digital AV file; outputting the digital AV file through the wireless network interface after the digital AV file is encrypted; using at least one display device including a wireless network interface, a AV decoder, and a display panel to receive the encrypted digital AV file through the wireless network interface; and outputting and displaying the digital AV file to the display panel after the encrypted digital AV file is decrypted and decoded by the AV decoder.

DETAILED DESCRIPTION OF THE PREFERRED EMBODIMENTS

Figure 1:
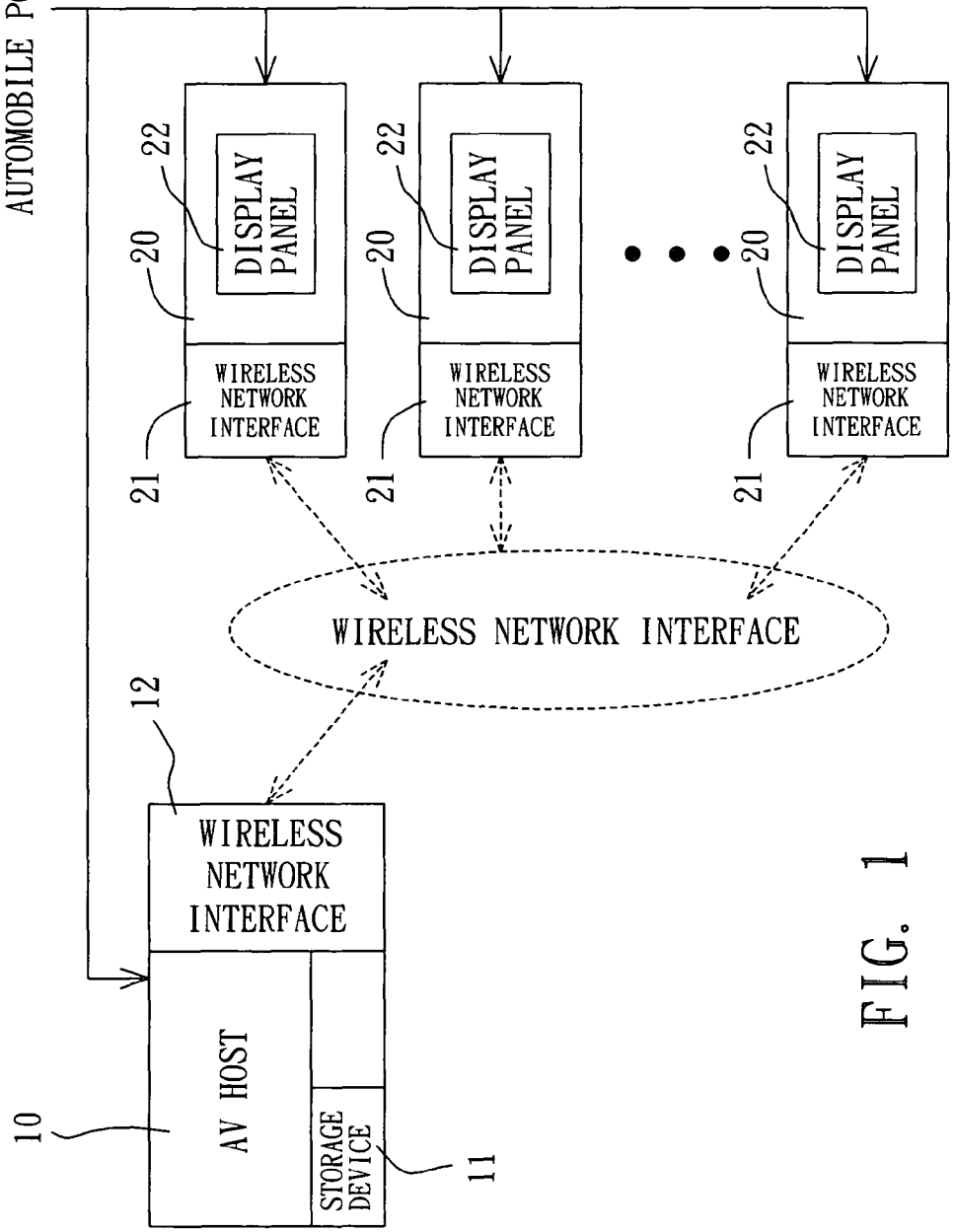
FIG. 1 is a schematic block diagram of a wireless car digital AV system of the present invention.

Referring to FIG. 1 for the schematic block diagram of a wireless car digital AV system of the present invention being applied in a car, the wireless car digital AV system comprises an AV Host 10 and at least one display device 20.

The AV Host 10 includes a storage device 11 and a wireless network interface 12, and the storage device 11 has at least one digital AV file. The storage device is, for example, but not limited to, a hard disk drive (HDD), a video optical disk drive (VCD) or a digital versatile disk drive (DVD) or other storage device, and the digital AV file is, for example, but not limited to, a JPEG file, a MPEG file, a H.264 file, a WMV file, a game file, or a file of other digital AV formats. To prevent foreign systems from unauthorized file receiving, the AV Host 10 may come with an encryption function, such that the digital AV file is encrypted before it is sent through the wireless network interface 12, wherein the encryption technology can be, but not limited to, CSS, RSA, DES, TDES, DVB-CSA, or other encryption technologies. In addition, the wireless network interface 12 is, for example, but not limited to, the IEEE802.11x (a/b/c/d/g/n), Bluetooth, or other wireless interface.

The display device 20 includes a wireless network interface 21 and a display panel 22. The display device 20 is connected to the AV Host 10 through the wireless network interface 21 to receive the encrypted digital AV file, wherein the wireless network interface 21 is, for example, but not limited to, a Bluetooth interface, IEEE802.11x (a/b/c/d/g/n), or other wireless network interface. However, this wireless network interface 21 must be compatible with the wireless network interface 12. The display panel 22 is, for example, but not limited to, a TFT-LCD or other flat panels.

During the installation, users just need to secure the AV Host 10 at, for example, but not limited to, the position adjacent to a driver's seat in a car, and connect the AV Host 10 to the power supply of the car, then secure at least one display device 20, for instance, at the back of a seat, and finally connect the display device 20 to the power supply of the car. Consequently, the digital AV file in the AV Host 10 can be encrypted before the file is sent to the display device 20 through the wireless network interface 12. The display device 20 decrypts and decodes the file, such that the AV signals can be displayed on the display panel 22 for user.

Figure 2:
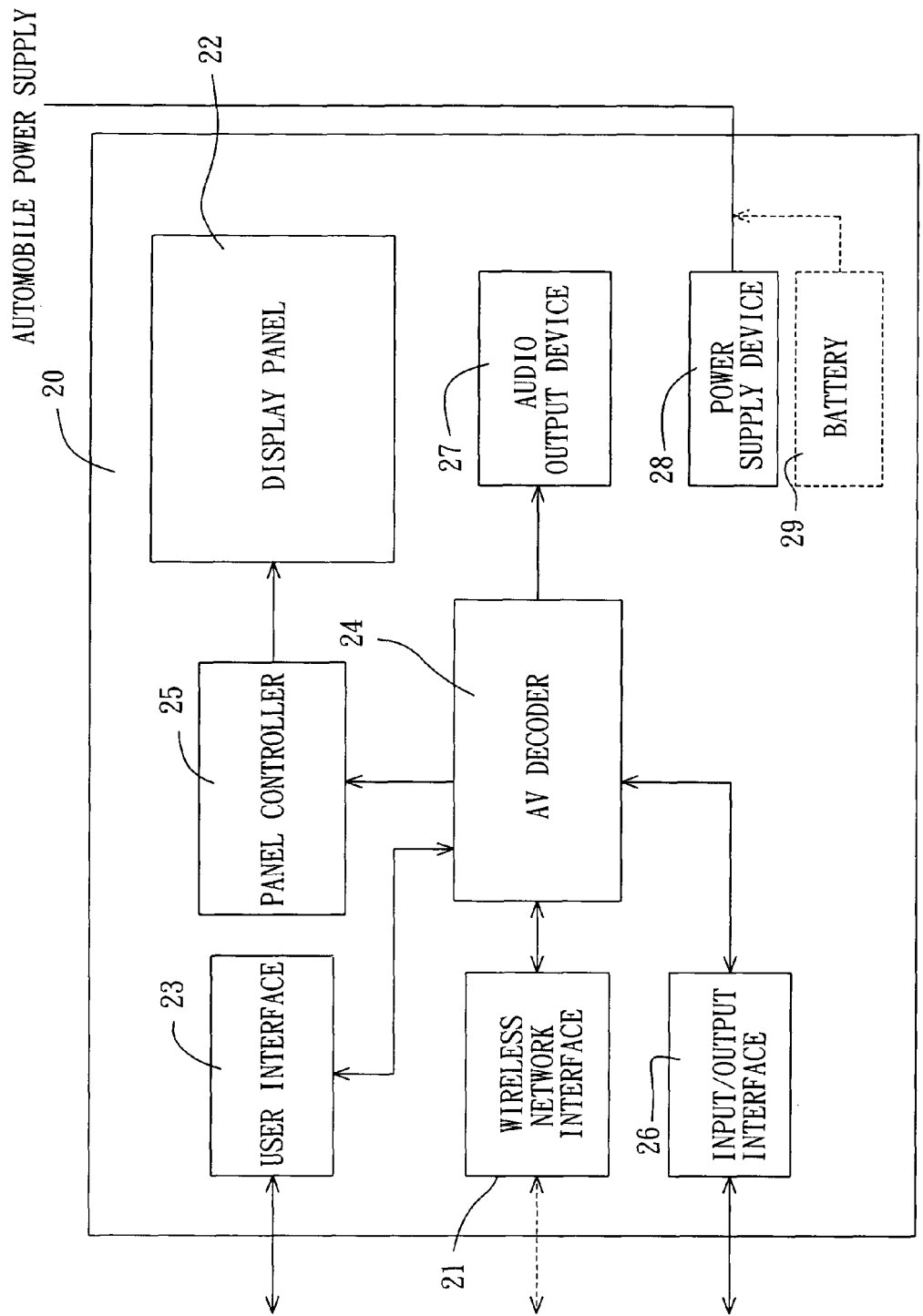
FIG. 2 is a schematic block diagram of a display device of the present invention.

Referring to FIG. 2 for the schematic block diagram of a display device 20 of the present invention, the display device 20 further comprises, apart through the wireless network interface 21 and the display panel 22, a user interface 23, a AV decoder 24, a panel controller 25, an input/output interface 26, an audio output device 27, a power supply device 28, and a set of press button (not shown in the figure) installed at exterior of the display device 20, a wireless remote controller, or a wired controller for users to operate the display device 20. The AV decoder 24 is coupled to the wireless network interface 21 and the user interface 23, wherein the AV decoder 24 can decrypt and decompress the encrypted and encoded digital AV file received through the wireless network interface 21, and then output the decoded AV signal.

The panel controller 25 is coupled to the AV decoder 24 to receive the video signal decoded by the AV decoder 24 and to drive the display panel 22 to display the video signal.

The input/output interface 26 is, for example, but not limited to, a USB interface or memory card readers, coupled to the AV decoder 24 and the USB interface can be used to connect an external USB peripheral or a storage device (not shown in the figure), for example, but not limited to, a USB storage device or a USB joystick.

The audio output device 27 is, for example, but not limited to, a loudspeaker or an earpiece socket coupled to the AV decoder 24 to output the decoded audio signal.

The power supply device 28 is connected to the car power system to obtain the required DC power. The power supply device 28 is further coupled to all other devices in the display device 20 to provide the driving power.

Furthermore, the wireless display device of the invention further comprises an optional battery 29 to supply the electric power required for the display device 20. The power supply of the battery 29 also allows the display device 20 to be portable.

Moreover, the display device 20 of the wireless car digital AV system further comprises a built-in firmware (not shown in the figure). The firmware can also be downloaded from the AV Host 10 to upgrade to a newer version. The firmware or the dynamically downloaded code can configure the display device 20 into different functions, such as but not limited to, a DVD decoder, a DTV decoder, a MP3 decoder, a game player, a GPS navigator, etc. If the display device 20 is configured to be a game player, then the game status of the game player can be further shared by other display devices 20 via the wireless network interface 21 to achieve the function of a multi-player interactive game.

Figure 3:
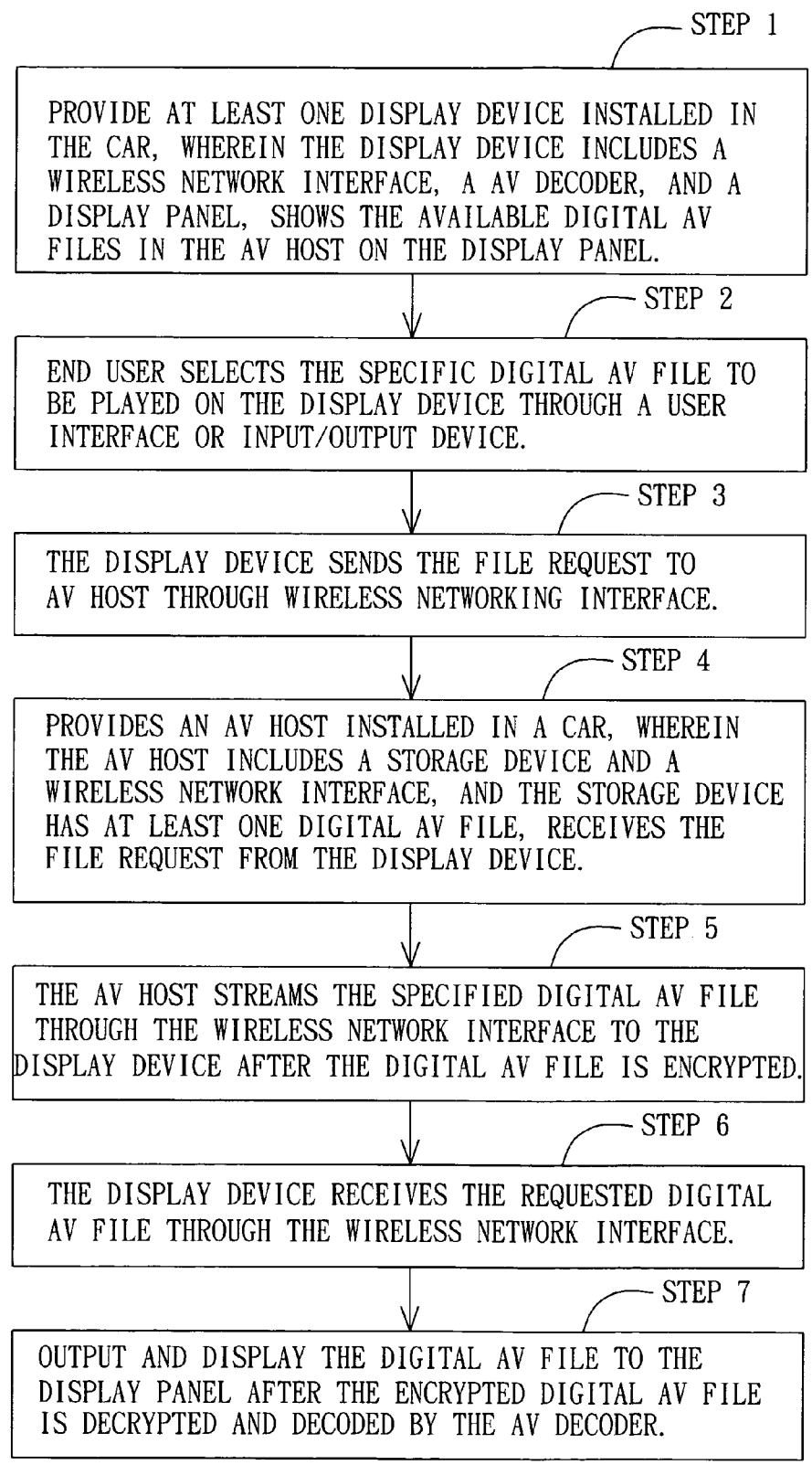
FIG. 3 is a flow chart of a method for transmitting a digital AV file from an automobile AV Host to a display device through a wireless transmission according to the present invention.
Figure 4:
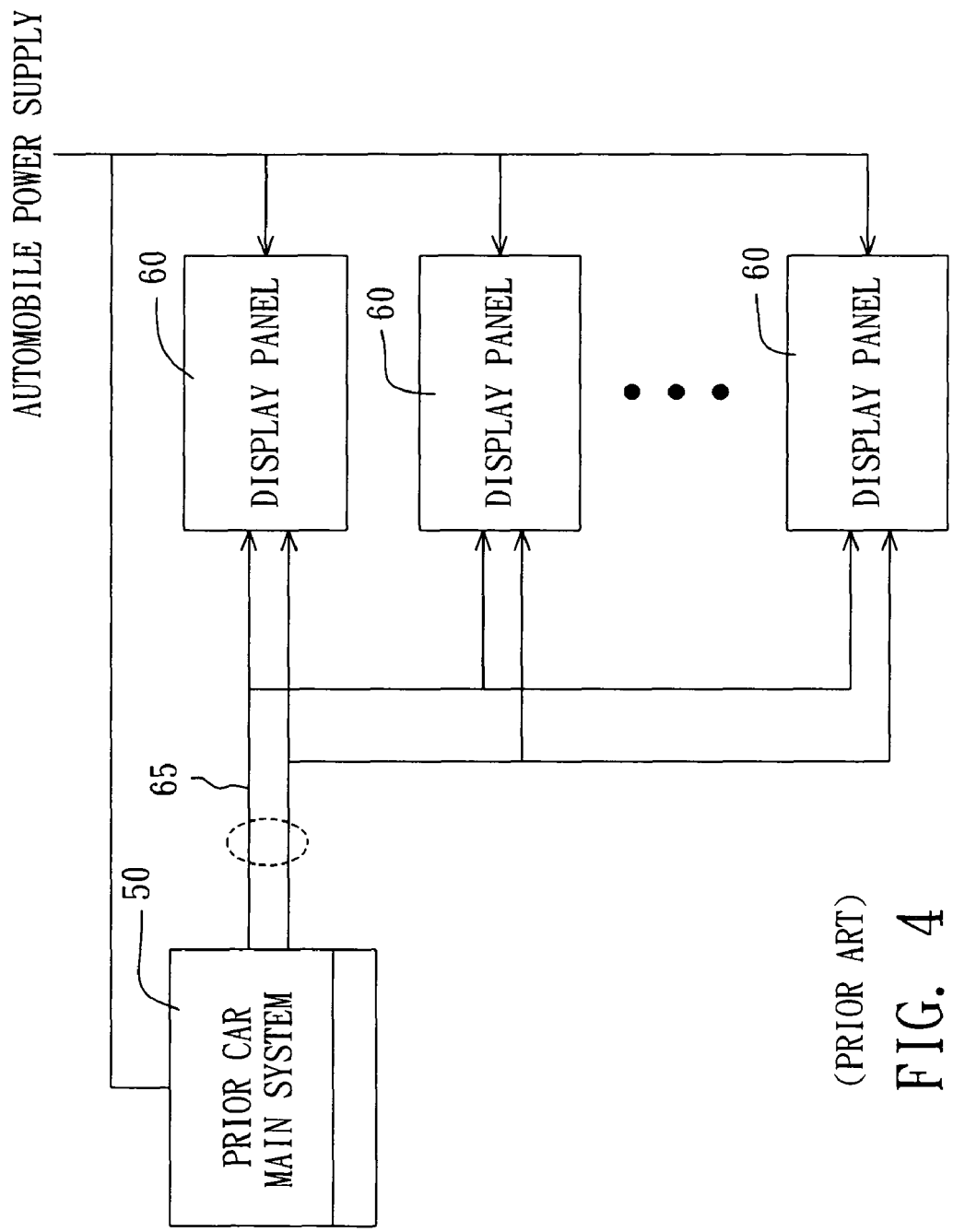
FIG. 4 is a schematic illustration of a conventional automobile video playing system.

Referring to FIG. 3 for the flow chart of a method of wirelessly transmitting a digital AV file from an automobile AV Host to a display device according to the present invention, the method comprises the following steps: providing at least one display device 20 installed in the car, including a wireless network interface 21, a AV decoder 24, and a display panel 22, shows the available digital AV files in the AV Host 10 on the display panel 22 (step 1); end user selects the specific digital AV file to be played on the display device 20 (step 2); the display device 20 sends the file request to AV Host 10 through wireless networking interface 21 (step 3); an AV Host 10 installed in the car, wherein the AV Host 10 includes a storage device 11 and a wireless network interface 12, and the storage device 11 has at least one digital AV file, receives the file request from display device 20 (Step 4); the AV Host 10 streams the digital AV file through the wireless network interface 12 after the specified digital AV file is encrypted (Step 5); the display device 20 receives the encrypted digital AV file through the wireless network interface 21 (Step 6); and outputting and displaying the digital AV file to the display panel 22 after the received digital AV file is decrypted and decoded by the AV decoder 24 (Step 7).

In Step 4, the storage device 11 is, for example, but not limited to, a hard disk drive (HDD), a video optical disk drive (VCD), a digital versatile optical disk drive (DVD) or other storage device, and the digital AV file is, for example, but not limited to, a JPEG file, a MPEG file, a H.264 file, a WMV file, a MP3 file, a WMA file, a game file, or a file of other digital AV formats. Furthermore, the wireless network interface 12 is, for example, but not limited to, a Bluetooth interface, an IEEE402.11x (a/b/c/d/g/n) interface, or other wireless network interface.

In Step 5, the digital AV file is encrypted before it is outputted through the wireless network interface 12 to prevent unauthorized foreign systems from receiving the files, wherein the encryption technology for the digital AV file can be CSS, RSA, DES, TDES, DVB-CSA, or other encryption technologies.

In Step 6, the wireless network interface 21 is, for example but not limited to, a Bluetooth interface, an IEEE802.11x (a/b/c/d/g/n) or other wireless network interface, but the wireless network interface 21 must be the same as the wireless network interface 12 of the AV Host 10, and the display panel 22 is a TFT-LCD or other flat panel display.

In Step 7, the display device 20 includes a AV decoder 24 as shown in FIG. 2. After the AV decoder 24 receives an encrypted and encoded AV file, the AV decoder 24 decrypts and decodes the file and sends the decoded video signal to the display panel 22 for display, and sends the audio signal to the audio output device 27 for output. Therefore, users can enjoy the digital AV file played back by the display device 20. The display device 20 further comprises a built-in firmware which can be downloaded from the AV Host 10 for upgrade, and users can also use the firmware to configure the display device 20 into different functions, such as a DVD decoder, a DTV decoder, a MP3 decoder, a game player, a GPS navigator, and so on.

In summation of the description above, the wireless automobile AV Host and its method use a wireless network interface to send multiple encrypted and encoded digital AV files to multiple display devices. The encrypted and encoded file is played after the display device decrypts and decodes the AV file, and the display device has an optional battery to supply the required power, and thus the display device has an advantage of portability. Therefore, the present invention can overcome the shortcomings of the conventional automobile video playing device.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A wireless car digital AV system, being installed in a car and comprising:
   an AV Host comprising a storage device, a wireless network interface, an encryptor;
   said storage device includes at least one digital AV file;
   said digital AV file is outputted from said wireless network interface after said digital AV file is encrypted by the encryptor;
   at least one display device comprising a display-device wireless network interface, a display panel, a user interface, an AV decoder, a panel controller, an input/output interface, an audio output device, a power supply device, a backup battery, and an operating controller, the operating controller is selected from a group consisting of a wireless controller and a wired controller for operating the at least one display device;
   the at least one display device being connected with said AV Host via the display-device wireless network interface being wirelessly connected to and transmitting and receiving digital signals to the wireless network interface;
   said at least one display device receives a digital AV file transmitted from said AV Host via the wireless network interface and the display-device wireless network interface;
   the user interface being installed at exterior of said at least one display device for operations of said display device;
   the AV decoder being directly wired to said display-device wireless network interface and said user interface to receive, decrypt, decode, and decompress said at least one digital AV file, and output decoded audio and video signals;
   the panel controller being directly wired to said AV decoder to receive said audio and video signals after said audio and video signals are decompressed by said AV decoder;
   said panel controller drives said display panel to display;
   an input/output interface being coupled to said AV decoder to connect an external storage device to the input/output interface to provide digital AV files;
   the audio output device being coupled to said AV decoder to output said decompressed audio signals;
   the power supply device being coupled to said user interface, a car power system, said AV decoder, said panel controller, and said input/output interface;
   the backup battery;
   the backup battery being coupled to said wireless network interface, said display panel, said AV decoder, said panel controller, and said input/output interface to supply the required electric power;
   the backup battery being coupled to said power supply device; and
   a firmware being downloaded from the AV Host;
   wherein said AV decoder of said at least one display device is directly wired to said display-device wireless network interface, said user interface, said panel controller, said input/output interface, and said audio output device;
   wherein, after said at least one display device sending a file request to said AV Host using said display-device wireless network interface and said wireless network interface, said AV Host streaming a requested digital AV file through said wireless network interface and said wireless network interface to said at least one display device after said requested digital AV file is encrypted.

2. The wireless car digital AV system of claim 1, wherein said storage device is a hard disk drive, a video optical disk drive, a digital versatile disk drive, or a combination of other storage devices.

3. The wireless car digital AV system of claim 1, wherein said digital AV file is a JPEG file, a MPEG file, a H.264 file, a WMA file, a game file, or a file of other formats.

4. The wireless car digital AV system of claim 1, wherein said digital AV file is encrypted by CSS, RSA, DES, TDES, DVB-CSA, or other encryption technology.

5. The wireless car digital AV system of claim 1, wherein said wireless network interface is a Bluetooth interface, an IEEE802.11X, or other wireless network interface.

6. The wireless car digital AV system of claim 1, wherein each of said at least one display device receives same or different AV files from said AV Host in parallel; and
   said display panel is a LCD or other flat panel.

7. The wireless car digital AV system of claim 1, wherein said user interface includes at least one press button.

8. The wireless car digital AV system of claim 1, wherein said input/output interface is a memory card reader interface, or USB interface to plug a USB storage device or a USB peripheral device, and said audio output device is a loudspeaker or an earpiece socket, and said power supply device plugs into said car power system to obtain the required DC power.

9. The wireless car digital AV system of claim 1, wherein said firmware being downloaded from said AV Host for upgrade configuring said display device to perform different functions comprising of a DVD decoder, a DTV decoder, a MP3 decoder, and a game player.

10. The wireless car digital AV system of claim 9, wherein if said display device is configured to perform functions of a game player, a game mode of said game player is shared via said wireless network to perform functions of a multi-player interactive game system.

11. A method for an automobile AV Host to send a digital AV file to a display device via a wireless transmission, comprising the following steps:
    providing an AV Host wherein said AV Host includes a storage device, a wireless network interface, and an encryptor;
    said storage device has at least one digital AV file;
    outputting said digital AV file via said wireless network interface, after said digital AV file is encrypted and encoded by the encryptor;
    providing at least one display device having a display-device wireless network interface, a display panel, a user interface, an AV decoder, a panel controller, an input/output interface, an audio output device, a power supply device, a backup battery, and an operating controller, the operating controller is selected from a group consisting of a wireless controller and a wired controller for operating the at least one display device, the display panel receiving encrypted and encoded audio and video signals via said display-device wireless network interface;
    the user interface being installed at exterior of said at least one display device for operations of said display device;
    the AV decoder being directly wired to said display-device wireless network interface and said user interface to receive, decrypt, decode, and decompress said at least one digital AV file, and output decoded audio and video signals; the panel controller being directly wired to said AV decoder to receive said audio and video signals after said audio and video signals are decompressed by said AV decoder; said panel controller driving said display panel to display; the input/output interface being coupled to said AV decoder for connecting an external storage device to the input/output interface to provide digital AV files; the audio output device being coupled to said AV decoder to output said decompressed audio signals, said AV decoder of said at least one display device being coupled to said display-device wireless network interface, said user interface, said panel controller, said input/output interface, and said audio output device;

connecting the power supply device to said user interface, a car power system, said AV decoder, said panel controller, and said input/output interface;

connecting the backup battery to the power supply device;

connecting the backup battery to said wireless network interface, said display panel, said AV decoder, said panel controller, and said input/output interface;

providing a firmware being downloaded from the AV Host;

wherein, after said at least one display device sending a file request to said AV Host using said display-device wireless network interface and said wireless network interface, said AV Host streaming a requested digital AV file through said wireless network interface and said wireless network interface to said at least one display device after said requested digital AV file is encrypted.

12. The method for an automobile AV Host to send a digital AV file to a display device via a wireless transmission of claim 11, wherein said storage device is a hard disk drive, a video optical disk drive, a digital versatile disk drive, or other storage device.

13. The method for an automobile AV Host to send a digital AV file to a display device via a wireless transmission of claim 11, wherein said digital AV file is a JPEG file, a MPEG file, a H.624 file, a WMV file, a game file, or a file of other format.

14. The method for an automobile AV Host to send a digital AV file to a display device via a wireless transmission of claim 11, wherein said digital AV file is encrypted using CSS, RSA, DES, TDES, DVB-CSA, or other compression technology.

15. The method for an automobile AV Host to send a digital AV file to a display device via a wireless transmission of claim 11, wherein said wireless network interface is a Bluetooth interface, an IEEE802.11X, or other wireless network interface.

16. The method for an automobile AV Host to send a digital AV file to a display device via a wireless transmission of claim 11, wherein said firmware is downloaded from said AV Host for upgrade and configuring said display device to perform functions of a DVD decoder, a DTV decoder, a MP3 decoder, or a game player.

17. The method for an automobile AV Host to send a digital AV file to a display device via a wireless transmission of claim 16, wherein if said display device is configured to perform functions of a game player, a game mode of said game player is shared via said wireless network interface to perform functions of a multi-player interactive game.

* * * * *